Oct. 19, 1954   E. PALMENTOLA ET AL   2,692,364
SMALL ELECTRIC MOTOR CONTROLLED FROM A REMOTE POSITION
Filed April 22, 1952
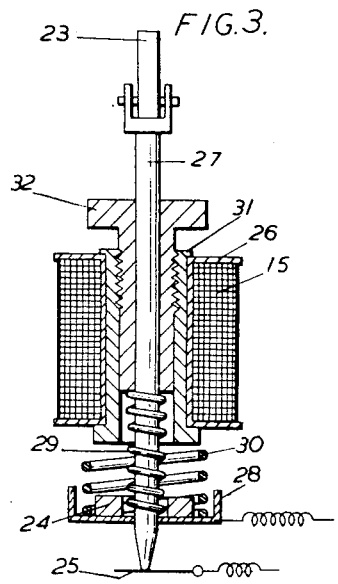
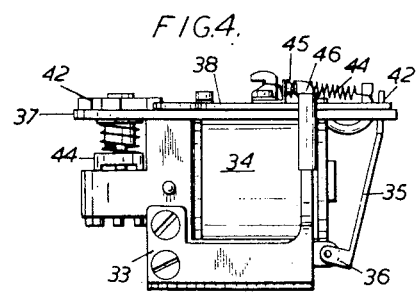
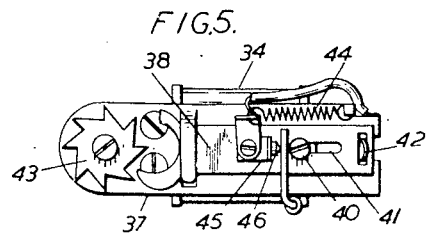
Inventors
ENZO PALMENTOLA and
UBERTO TRAVAGLI Patented Oct. 19, 1954

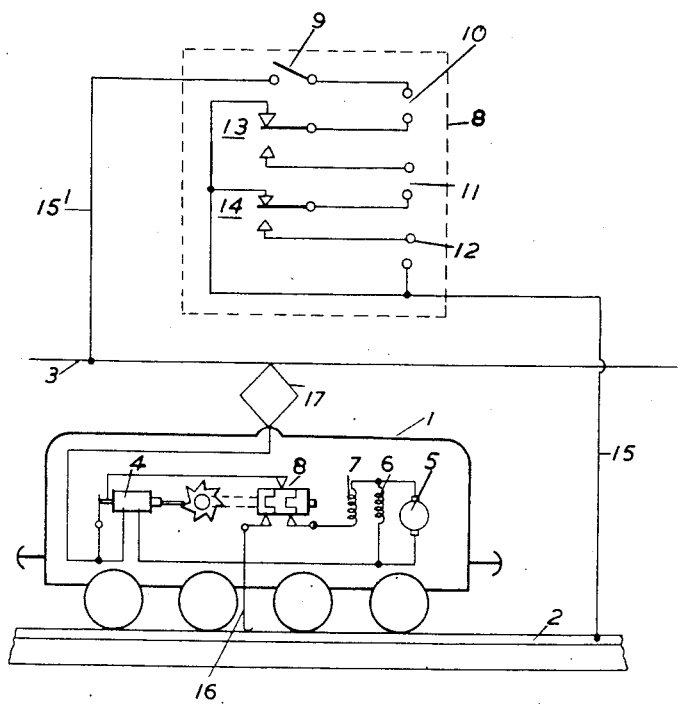
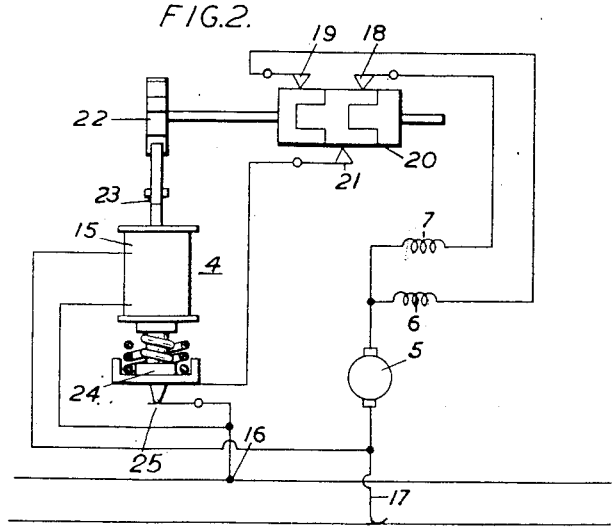

2,692,364

UNITED STATES PATENT OFFICE 2,692,364

SMALL ELECTRIC MOTOR CONTROLLED FROM A REMOTE POSITION

Enzo Palmentola, Naples, and Uberto Travagli, Rome, Italy, assignors to "Rivarossi" Officine Miniature Elettroferroviarie Soc. Acc. Sempl. di A. Rossi, F. Brunner & C., Como, Italy, a firm Application April 22, 1952, Serial No. 283,628

Claims priority, application Italy April 27, 1951

4 Claims. (Cl. 318—297)

This invention relates to small electric motors controlled from a remote position and has an important application in miniature self-propelled vehicles such as miniature trains which are controlled from a fixed position. In D. C. motors having a permanent magnet field the direction may be reversed by changing over the supply connections. With self-excited windings, however, it is necessary to reverse the relative direction of the field and the armature.

In the control of miniature electric trains it has been proposed to employ a reversing switch actuated by an over-voltage relay which is located on the train itself and which is inoperative at the normal running voltage but which may be actuated to change the direction of running by temporarily applying an over-voltage. Such an arrangement provides a simple control lay-out, but if the relay is sluggish in action, or the over-voltage is applied for too long, there is a risk of overheating the motor, and, furthermore, if the over-voltage continues after the connections have been changed there is a risk that the vehicle will suddenly start up in the new direction at an excessive speed, with consequent risk of mechanical damage.

An object of the invention is to provide an improved arrangement in which the above disadvantages are substantially avoided.

Another object is to provide a simple control arrangement for toy trains.

The present invention comprises an electric motor provided with a reversing switch actuated by an over-voltage relay, the coil of which is connected in shunt with the motor so as to be energised over the motor supply line, and the arrangement being such that upon successive actuations of the relay by a predetermined over-voltage the motor is alternately connected for forward and reverse running, the relay being inoperative at the normal motor voltage and arranged when actuated by an over-voltage to open normally closed safety contacts in the motor circuit which interrupt the motor current when an over-voltage is applied to actuate the relay.

The electric motor may be either a D. C. motor having a self-excited field winding, or, alternatively, it may be a single-phase A. C. motor.

It will be appreciated that when the relay is actuated by an over-voltage the auxiliary motor contacts should open during the initial part of the armature movement to minimise the time during which the over-voltage is applied to the motor, and should remain open until the last part of the return movement.

The relay armature movement may conveniently be in two stages so that it has two operative positions, a first position in which the motor circuit is interrupted and a second operative position in which the reversing switch is actuated, the first position being reached when a relatively low over-voltage is applied and the second position being reached when a relatively high over-voltage is applied, so as to effect a greater travel of the relay armature. The reversing switch may be of a rotating type which is notched forward by a ratchet each time the relay is actuated. As applied to a toy electric train the supply lines may be provided by rails or overhead trolley lines, or one line may be a rail and the other an overhead trolley line.

In order that the invention may be clearly understood reference will now be made to the accompanying drawings which show an example of the invention, in which:

Fig. 1 shows diagrammatically a toy locomotive embodying the invention.

Fig. 2 is a circuit arrangement of the electrical apparatus mounted on the locomotive shown in Fig. 1, Fig. 3 shows in section a relay suitable for use with the arrangement of Figs. 1 and 2, Fig. 4 is a side elevation of an alternative form of relay, and Fig. 5 is a plan view of the relay shown in Fig. 4.

In Fig. 1 the general outline of the toy locomotive is indicated by the reference 1, whilst 2 is a rail and 3 an overhead trolley line. On the locomotive the relay is indicated by the reference 4 and the reference 5 indicates the motor armature which has "forward" running field winding 6 and a reverse running field coil 7. The dotted rectangle 8 above the trolley line indicates the control apparatus which is located at a fixed point from which the locomotive would be controlled. The control apparatus 8 includes an open-circuiting switch 9, three voltage supply sources, which may be A. C. or D. C., connected to supply terminals 10, 11, 12 respectively, and two directional contact switch 13 and 14. With switches 13 and 14 in the positions shown, if the switch 9 is closed the motor circuit is completed through the supply source at 10, the connections to the motor being through the lines 15 and 15' which are respectively connected to one of the rails and to the overhead trolley wire. Obviously alternative supply arrangements could be employed, for instance the supply could be through a conductor rail and one of the running rails. If, now, the switch 13 is depressed the supply source at terminals 11 is connected in series with the supply at terminals 10, and the increased voltage would be sufficient to operate the relay in the case where this is a single-stage relay, or to operate to the first position in the case of a two-stage relay. If, now, the switch 14 is depressed the voltage supply source at 12 will be connected in series with those at 10 and 11. This arrangement would only be employed in the case of the two-stage relay and would serve to move the relay to the second position.

It will be appreciated that in an actual control apparatus the switches 13 and 14 may be controlled from a lever or push-button or other suitable manually operated member, so that they operate in turn, i. e. so that when the lever is depressed first 13 is depressed and then 14, whilst when the lever is raised the sequence of operations would be reversed so that 14 first lifts to the position shown in the drawings and then 13.

As an example of the values of battery voltage suitable for a toy train, terminal 10 might be fed with 24 volts, 11 with 36 volts and 12 with 30 volts. Thus 10 and 11 together would give a voltage of 60 volts for operating the relay, whilst with 12 there would be 90 volts available. With such an arrangement the motor would only be subjected momentarily to 60 volts and at no time would the full 90 volts be applied.

Referring now to the electrical circuit shown in Fig. 2, it will be observed that the operating coil 15 of the relay is electrically connected directly to contacts 16 and 17 which bear against two supply lines 2 and 3. The contacts 16 and 17 constitute supply terminal points for the vehicle. The motor field windings 6 and 7 are at one end connected to the motor armature 5 and at the other end are connected to contact brushes 18 and 19 bearing on a rotating commutator member 20 which, as it is rotated, connects a third brush 21, first with brush 19, and then with 18. This commutator member 20 is actuated from ratchet device 22 which it stepped forward by a pawl 23 operatively connected with the relay armature 24 each time the relay is actuated. The brush 21 is connected through normally closed contacts 25 with the pick-up contact 16, and the action of the commutator member is such that in one position it will connect the brush 18 with the common brush 21 so that the forward field coil 7 is energised, whilst when it is stepped forward to the next position contacts 19 and 21 will be inter-connected so that the reverse field coil 7 is energised. Thus it will be appreciated that each time the relay 4 is actuated the rotatable commutator 20 changes the direction of running of the locomotive alternately for forward and reverse running. Whilst the actual arrangement shown employs a rotating commutator, clearly other arrangements could be employed. For instance, the commutator could be replaced by a rotating cam member which bears against contacts.

It will be observed that the motor circuit is completed by the fact that the armature 5 is connected to the pick-up contact 17 so that the energising circuit for the relay coil is independent of the motor circuit. The normally closed contacts 25 are, however, in the motor circuit and are so arranged that when the relay armature is attracted the contacts 25 open and interrupt the motor circuit.

Referring now to Fig. 3, which shows the relay in greater detail, the actual relay shown being a two-stage relay, the relay winding 15 is mounted on a bobbin 26 whilst 24 is the relay armature which is mounted on a spindle 27, which is preferably of non-magnetic material such as brass and is slidable through the relay coil. Secured to the armature 24 is a cup-shaped member 28, and a biasing spring 29 bears against the plate 28 to hold the armature downwards, the spring 29 being effective over the first stage of movement, at completion of which a second spring 30 also bearing at one end against the plate 28, but normally spaced from the bobbin 26 at its other end, will come into operation and be effective over the second stage of movement. Fixedly mounted within the bobbin 26 is an outer sleeve 31 and an inner sleeve 32 which is mounted within the outer sleeve 31 and makes screw-threaded engagement therewith, the spindle 27 being slidable through the inner sleeve. The spring 29 bears against the end of the inner sleeve 32 and by screwing this along the outer sleeve 31 the tension exerted by the spring 29, and hence the setting of the relay, can be controlled.

In operation it will be appreciated that the normal motor running voltage applied by the voltage supply at 10 will not actuate the relay and it will remain in the position shown in Fig. 3. In this position the lower end of the spindle 27 bears against the contact 25 and a circuit is completed between the terminal contacts 16 and 17. Suppose now that the first switch 13 is depressed so that the voltage source at 11 is included and an increase voltage, say, 60 volts is applied to the line; the relay will now be operated and the amature will lift until the spring 30 bears against the ends of the bobbin 26. This will lift the lower end of the spindle 27 from contact 25 and break the circuit through the motor. The movement of the spindle 27, however, will be insufficient to cause the pawl 23 to actuate the ratchet 22. If now the switch 14 is also depressed so as to apply the voltage source at 12 in addition, so that a total voltage of, say, 90 volts is applied, the relay armature will complete its second stage of movement which will compress the spring 30, and this movement will be sufficient for the pawl 23 to engage the ratchet 22 and step round the reversing switch to the next position. When contact 14 is now opened, the relay armature will drop so that the spring 30 ceases to be compressed but still bears against the end of the bobbin 26. In this position the pawl 23 will be retracted from the ratchet 22 but the motor circuit will still be open. If now the switch 13 is raised the relay armature will fall back to its original position as shown in Fig. 3, the motor circuit will be completed through contact 25 and the locomotive will start running in the opposite direction.

It will be appreciated that this arrangement ensures the motor circuit is always broken before the directional switch is changed over and that the motor is not reconnected in the circuit until the changeover is completed and the over-voltage has been removed. Moreover, the low overvoltage is only applied to the motor momentarily during the time occupied by the spindle 27 in separating from the contact 25. It will be appreciated that whilst the two-stage relay shown in Fig. 3 provides a high degree of protection, it is not always necessary to employ the two stages, but in many cases the spring 30 may be omitted and likewise the contacts 14 and voltage source 12. The relay must be so arranged that the spindle separates from the contact 25 immediately the relay armature commences to move.

Figs. 4 and 5 show a modified form of relay and switch in which 33 is a body portion, 34 the relay coil and 35 the armature, which is hinged at 36 to the body portion 33. Secured to the body 33 is a top plate 37 on which slides a pawl 38 guided by a bridge member 39 and pin 40 fixed to the top plate 37 and passing through a longitudinal guide slot 41 in the pawl 38. The free end 42 of the armature 35 passes through a slot in the pawl 38 and when the armature is attracted the pawl is slid to the left and engages the ratchet wheel 43 to rotate switch member 47 to the next position. The pawl 38 is biased to the right by a spring 44 and in the position of rest a contact 45 on the pawl engages a contact 46 fixed to the body portion 33. Contacts 45 and 46 correspond to the contact 25 of Fig. 3. and when the armature is attracted the pawl is moved to the left to operate the switch. At the same time contacts 45, 46 open and the motor circuit is broken. The switch member 47 as shown carries a bridge piece which, as it rotates, engages successive pairs of contact studs 48. These may be so wired that as the switch member is rotated step by step, the direction of rotation of the motor is reversed in each successive position.

The foregoing description, taken in conjunction with the drawings, is to be regarded as describing an example only of the invention and clearly modifications may be introduced without departing from the spirit of the invention.

What we claim is:

1. The combination of a small reversible electric motor having field windings for forward and reverse rotation; and an energising and control circuit for said field windings including means for supplying electric current at selectively varied voltages, actuatable switching means having a single input and two outputs and operative to connect said input alternately to first one and then the other of said outputs in response to actuation of the switching means, conducting means electrically connecting said forward and reverse field windings to said one output and said other output, respectively, of the switching means and to one side of said supplying means, normally closed circuit breaking means, conducting means electrically connecting said circuit breaking means in series with said input of the switching means and with the other side of said supplying means, a relay connected to said supplying means for energisation by the latter, means driven by said relay for actuating said switching means, and means driven by said relay for opening said circuit breaking means, said relay and said means for actuating said switching means and for opening said circuit breaking means being arranged so that, when a normal voltage is derived from said supplying means, both said actuating means and said opening means are inoperative, and so that, when the voltage is increased above said normal voltage, said relay first operates said means opening said circuit breaking means to interrupt the electric supply to the motor and then operates said switch actuating means for reversing the connections to said forward and reverse field windings.

2. The combination of a small reversible electric motor having field windings for forward and reverse rotation; and an energising and control circuit for said field windings including an electrical source for supplying electric current at selectively varied voltages including a normal, relatively low voltage, a first increased voltage and a second further increased voltage, actuatable switching means electrically connected to said forward and reverse field windings of the motor and operative to alternately establish electrical communication with said windings in response to actuation of the switching means, normally closed circuit breaking means connected in series between said switching means and said source for interrupting the supply of current to said windings when said circuit breaking means is opened, an electro-magnetic relay electrically connected to said source for energisation by the latter, said relay having an armature occupying a normal position when said relay is subjected to said normal voltage and being displaced to a first operative position and a second operative position when the relay is subjected to said first and second increased voltages, respectively, means driven by said armature and operative to open said circuit breaking means when said armature is displaced to said first operative position and then to maintain said circuit breaking means in its open condition during movement of said armature to its second operative position and until the return of said armature to its normal position, and means driven by said armature and operative to actuate said switching means when said armature is displaced to said second operative position so that, as the voltage emitted by said source is increased from said normal voltage to said first increased voltage and then to said second further increased voltage, the supply of current to the motor is halted and the connections to the field windings are then reversed to change the direction of rotation of the motor, with the supply of current to the motor being reinstated only upon the return of the voltage to its normal value.

3. The combination according to claim 2; wherein said circuit breaking means includes a fixed contact and a movable contact arranged for movement with said armature of the relay, said movable contact engaging said fixed contact when said armature is in said normal position thereof and being separated from said fixed contact in response to movement of said armature away from said normal position in the direction toward said first and second operative positions.

4. The combination according to claim 2; wherein said switching means includes a member rotatable in a step-by-step manner, each step-by-step angular displacement of said member being effective to interrupt the electrical communication with the one of said field windings then being energized and to establish electrical communication with the other of said field windings; and wherein said means for actuating the switching means includes a ratchet connected to said rotatable member for driving the latter, and a pawl operatively connected to said armature and being free of said ratchet during movement of said armature between said normal and first operative positions of the latter, said pawl engaging said ratchet to effect angular displacement of the latter and said rotatable member only during the displacement of said armature from said first operative position to said second operative position of the latter.

References Cited in the file of this patent
UNITED STATES PATENTS

| Number | Name | Date |
|---|---|---|
| 1,569,233 | Morton | Jan. 12, 1926 |
| 1,931,548 | Jones | Oct. 24, 1933 |
| 2,515,480 | Webb | July 18, 1950 |